United States Patent
Cameron et al.

[15] 3,646,311
[45] Feb. 29, 1972

[54] METHOD AND APPARATUS FOR VERTICAL TORCH OSCILLATION INVERSELY TO CURRENT MAGNITUDE

[72] Inventors: James A. Cameron, Niantic; Joseph Lanzafame, Gales Ferry, both of Conn.; Leonard E. Mann, Woodridge, Ill.

[73] Assignee: General Dynamics Corporation, New York, N.Y.

[22] Filed: Oct. 29, 1968

[21] Appl. No.: 804,332

[52] U.S. Cl. ......................... 219/137, 219/131, 219/124
[51] Int. Cl. ........................................................ B23k 9/00
[58] Field of Search ............... 219/125, 124, 131, 130, 60.1

[56] References Cited

UNITED STATES PATENTS

| | | | |
|---|---|---|---|
| 2,813,190 | 11/1957 | Felmley, Jr. | 219/76 |
| 3,053,975 | 9/1962 | Nelson et al. | 219/130 |
| 3,131,325 | 4/1964 | Briggs | 219/131 F X |
| 3,182,178 | 5/1965 | Libby | 219/130 |
| 3,230,341 | 1/1966 | Blackburn | 219/125 |
| 3,428,774 | 2/1969 | Faust et al. | 219/137 X |

*Primary Examiner*—J. V. Truhe
*Assistant Examiner*—George A. Montanye
*Attorney*—William C. Everett

[57] ABSTRACT

A process and system for welding of the tungsten inert gas (TIG) type is described. A welding torch is mounted on a mechanism which provides for motion of the torch with respect to the work (a pipe being welded) in three different directions. Movement in each direction is electronically controlled so as to obtain preset magnitudes of oscillation of the torch, both vertically and laterally with respect to the work. The vertical oscillation is provided by following the pulsating arc current in accordance with a preselected control function. In addition, the system and process provides for control of substantially all of the parameters affecting the formation of the weld in order to produce improved weldments.

4 Claims, 20 Drawing Figures

JAMES M. CAMERON
JOSEPH LANZAFAME
LEONARD E. MANN
INVENTORS

BY their attorney

JAMES M. CAMERON
JOSEPH LANZAFAME
LEONARD E. MANN

INVENTORS

BY their attorney

JAMES M. CAMERON
JOSEPH LANZAFAME
LEONARD E. MANN

INVENTORS

Fig. 13

JAMES M. CAMERON
JOSEPH LANZAFAME
LEONARD E. MANN
INVENTORS

BY their attorney

JAMES M. CAMERON
JOSEPH LANZAFAME
LEONARD E. MANN
INVENTORS

BY their attorney

JAMES M. CAMERON
JOSEPH LANZAFAME
LEONARD E. MANN
INVENTORS

BY their attorney

METHOD AND APPARATUS FOR VERTICAL TORCH OSCILLATION INVERSELY TO CURRENT MAGNITUDE

The present invention relates to methods and systems for arc welding, and particularly to systems and process for arc welding wherein a pulse current is supplied to form the arc.

The invention is especially suitable for use in pulsed arc welding systems of the nonconsumable electrode type which are also known as tungsten inert gas or TIG welding systems. While the invention is described in connection with the welding of joints between sections of pipe, it will be appreciated that features of the invention provide for the automatic control of substantially all parameters affecting the formation of a weld and therefore the invention may be applied to accomplish welding regardless of the type of weldment, joint design, positional relationship of torch with respect to the work or the metallurgical characteristics of the materials to be welded.

In the practice of pulsed arc welding, a pulsating welding current is applied to the torch during the welding cycle in order to control both the melting and solidification of the weld. The control of the waveform of the current pulses provides a measure of control of resulting weld. It has been found, however, that additional control is desirable in order to accomplish fully automatic arc welding of the various joint designs, materials, and work to torch positional relationships which may be encountered. Automatic arc welders which are available have been limited to applications where the work remains essentially in the same position with respect to the weld. While control over the pulsed arc permits greater flexibility in weld torch positions, more flexibility is required in order to provide for universal automatic arc welding.

It has been found in accordance with the invention that additional parameters which affect the weld may be provided and controlled in a manner integrated with the control of the pulse arc so as to provide a practical fully automatic arc welding machine. A welding machine embodying the invention therefore is adapted to produce precision welds and to operate in all positions, thus making automatic welding possible where only slow manual welding techniques could heretofore be used. The parameters which have been made available for control in accordance with the invention are an oscillatory movement of the torch with respect to the work, both in a vertical direction (viz height control) and in a transverse direction (viz laterally across the weld). The oscillations may be synchronized with the current pulses supplied to the arc in order to provide integrated control of the formation of the weld (viz to control melting and fusion).

Thus, it is a feature of the invention to provide controllable parameters which are effective in determining the nature of a weld and to integrate the control of such parameters so as to make the welds rapidly, precisely and irrespective of the position of the weld with respect to the torch. Among the parameters referred to above are current magnitude, current pulse, shape and rate, oscillatory movement of the torch with respect to the work, both vertically and laterally, and longitudinal movement of the work with respect to the torch (viz travel of the torch along the weld).

Further features of the invention are to provide protection both of the work and the torch in the event of failures in the system such as loss of inert gas, cooling water, breakdown of electrical components and the like.

Still further features of the invention reside in the ease with which the system may be set up and adjusted to accommodate various sizes of work.

Another feature which is afforded by the availability of control over all of the welding parameters is that it facilitates the use of lower arc voltages, thereby reducing the possibility of burning and other damage to the work.

Still another feature arising out of the availability of the controlled welding parameters is precise quantized agitation of the weld puddle so as to control the metallurgical characteristics of the weld. The control over the weld parameters also provides control of the contour of the weld and substantially eliminates undercutting of the sidewalls of the welded joint.

The principal object of the invention therefore is to provide an improved process of and system for pulsed arc welding which is capable of producing weldments automatically.

A still further object of the invention is to provide an improved process of and system for pulsed arc welding which controls parameters which are effective in determining the nature of a weld so as to produce better welds faster than heretofore feasible.

A still further object of the invention is to provide improved systems and processes for controlling in an integrated manner, all the parameters which are effective in determining the nature of a weld made by pulsed arc welding.

A still further object of the present invention is to provide an automatic welding machine having the features mentioned above.

Fully automatic arc welding requires that the arc be initiated automatically and in a manner which will prevent damage to the torch as well as to the work. In earlier automatic arc welding machines, arcs were started by applying high-frequency energy in the region between the torch electrode and the work. The high-power high-frequency generator necessary to supply the starting energy is both costly and provides undesirable side effects, such as interference with radio transmission and reception.

It has been found in accordance with this invention that such high-frequency techniques may be eliminated and the arc initiated by automatic means for applying the starting current to the torch in timed relationship with the movement of the torch from a position in contact with the work to a position away from the work.

Accordingly, it is an object of the invention to provide an arc welding system having simplified means for initiating the arc which prevents any damage, either to the torch or to the work during arc initiation.

Briefly described, a method of and system for pulsed arc welding embodying the invention includes the step of applying pulsed welding current to provide an arc between the work and welding torch. The magnitude, wave shape and frequency of this current may be preset in order to provide the desired weld formation characteristic. The torch is also oscillated vertically with respect to the work in synchronism with the pulsating arc current, thereby providing another parameter effective in determining the nature of the weld. This parameter may be controlled by sensing the pulsating arc voltage and generating a control signal in response thereto which is adapted to move the welding torch in a direction and with an amplitude to provide the desired control over this vertical oscillation parameter. The welding torch may also be oscillated laterally with respect to the weld to provide another parameter which may be preset, both as regards the amplitude and location of the lateral oscillatory movement of the torch with respect to the weld. The movement or travel of the torch with respect to the work lengthwise along the weld is also controlled so that the arc is initiated and all of the other parameters affecting the weld are established and are maintained in proper time relationship over successive regions of the weld.

Mechanisms are provided for positioning and oscillating the torch as well as for moving the entire torch assemblage with respect to the work so as to travel along the weld. These mechanisms include means for adjustment to accommodate various sizes of work in a manner not to interfere with the oscillation of the torch, both vertically and laterally with respect to the weld.

The system for initiating the arc utilizes the means for vertically oscillating the torch to touch the work and further includes circuits for detecting the starting current and moving the torch away from the work. A control circuit is also provided for electrically preventing the torch from leaving the work until the current supplied to the torch is within the range which will start the arc without causing damage to the work.

The invention itself, both as to its organization and method of operation, as well as additional objects and advantages thereof will become more readily apparent from a reading of the following description in connection with the accompanying drawings in which:

Figure 1:
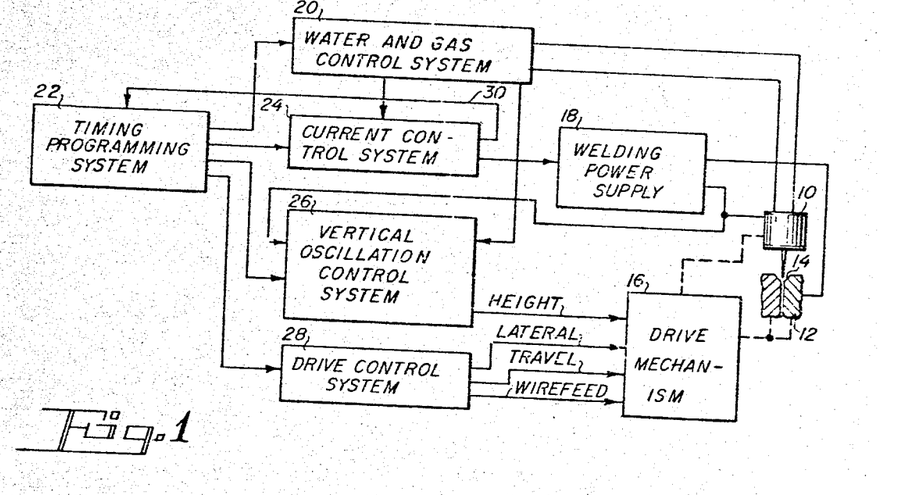
FIG. 1 is a block diagram of a welding system embodying the invention.
Figure 13:
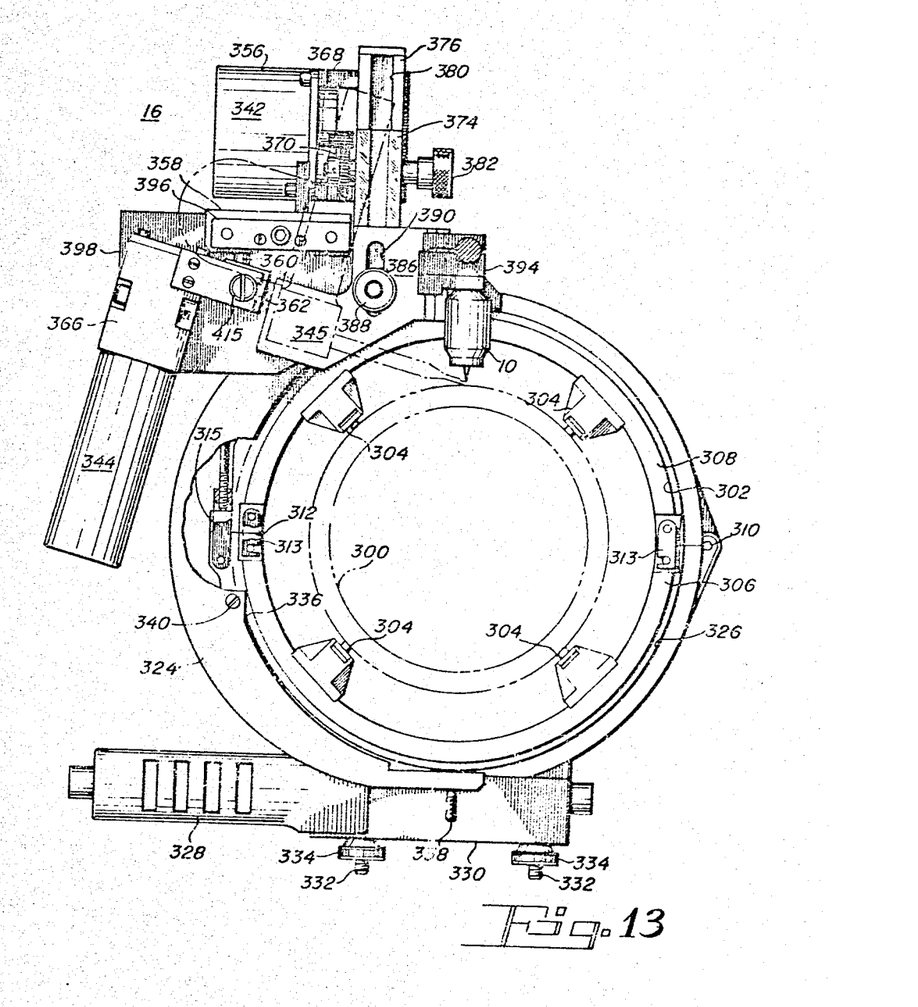
FIG. 13 is an elevational view of the mechanism of the automatic arc welder which embodies the invention.

Referring more particularly to FIG. 1, the arc welding torch 10 and the work 12 to be welded at a joint 14 are schematically depicted. The work 12 may be sections of pipe, as shown in FIG. 13. FIG. 13-20 also illustrate the mechanisms 16 which support and drive the torch 10 and the work 12 so as to accomplish welding automatically. The electrical energy for providing the arc which causes melting in the joint region and of any filler material supplied thereto is provided by a welding power supply 18, the output terminals of which are connected respectively to the work 12 and to the electrode in the torch 10. The torch 10 also receives inert gas and cooling water from a water and gas control system 20. This system contains valving, as well as detectors for monitoring the flow of water and inert gas.

The driving mechanism 16, the welding power supply 18 and the water and gas control system 20 are all controlled so as to make the welds automatically. Automatic control is obtained by means of a timing and programming system 22 to be described in greater detail in connection with FIG. 2. When the welding cycle is initiated, say by pressing a start button, a command level is applied to the electrically controlled water and gas valves in the water and gas control system 20. After an appropriate delay, as is obtained by digital delay devices in the programming system 22, a command is provided via a current control system 24 to the welding power supply which energizes the electromagnetically operated switches which connect the powerlines to the welding power supply 18. Digitally operative timing circuits in the programming system 22 are operative to provide an enabling level to logic circuits in a vertical oscillation control system 26 which is coupled to the section of the drive mechanism 16 which enables vertical oscillation of the torch 10 with respect to the work, and therefore controls the height of the torch over the work 12.

After the height control command is provided by the programming system 22 to the vertical oscillation control system 26, the circuits therein which control the movement of the torch towards and away from the work upon starting or arc initiation are activated. After the arc is initiated, other portions of the vertical oscillation control system 26 are operative to sense the pulsating current which is supplied to the torch by the welding power supply 18 under the control of the current control system 24, whereby to oscillate the torch vertically during the welding cycle in synchronism with the current pulses. Digital timing circuits in the timing-programming system 22 also enable the drive control systems 28 which control the lateral oscillation drive in the drive mechanism 16, as well as the travel and wire feed drives of the mechanism 16. Upon receipt of these command signals, the drive control system 28 is then enabled to provide the preselected rates of lateral oscillation, travel and wire feed during the welding cycle. The drive control systems 28 will be discussed hereinafter in connection with FIG. 4.

The timing-programming system 22 also serves to shut down the system by providing a command to the current control system to decrease the welding current (hereinafter referred to as a slope enable command). This command is also used in the timing and programming system 22 to generate commands for the drive control system 28 to stop the lateral oscillations and wire feed, as well as to control the vertical oscillation control system 26 to stop the height changes of the torch, thus keeping the arc length constant. An output 30 which is obtained from the current control system circuits, which produce the decreasing welding current, is detected in the timing and programming system 22. When this output reaches a predetermined level, indicative of reduction of welding current to a level which will permit cutoff of such current without difficulty due to transients and the like, the timing system initiates a clear command which stops all of the drives, shuts down the welding power supply, as well as the supply of water and gas. The gas and water may be permitted to flow during a short post flow time after shutdown by virtue of a delay circuit which is switched into the water and gas flow control system 20 upon initiation of the clear command.

Figure 2:
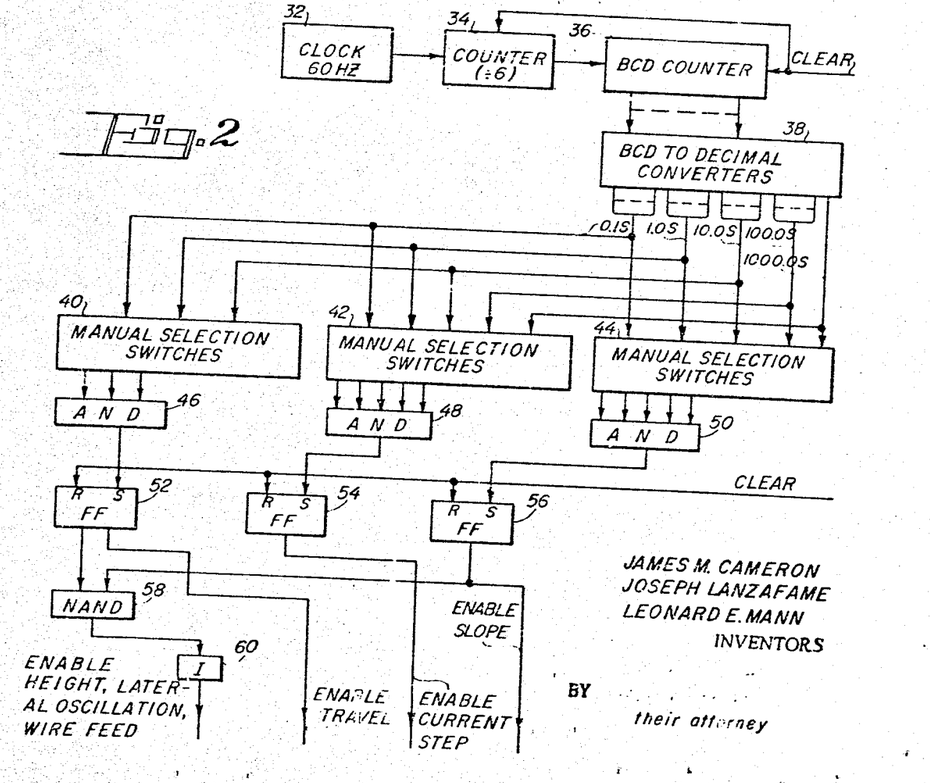
FIG. 2 is a more detailed block diagram of the programming system shown in FIG. 1.

FIG. 2 is a simplified block diagram of the timing programming system 22. The primary timing signals are obtained from a clock source 32 which may be the 60 Hz. alternating current line. The clock source 32 may include shaping circuits which provide pulses at the 60 Hz. rate. These pulses are applied to a counter 34 in which the pulse rate is divided by six to provide pulses at a 10 Hz. rate. The 10 Hz. pulses are then applied to a chain of BCD counters 36. The outputs of the counters are converted from binary coded decimal to decimal form in binary coded decimal (BCD) to decimal converters 38, one of which may be provided for each of the BCD counters. The conversion therefore produces a plurality of groups of outputs (five being shown in the drawings) from the BCD to decimal converters 38. The first group contains ten outputs, each corresponding to one-tenth second intervals. In other words, a pulse will occur on each of the outputs every one-tenth second, two-tenth second ... to nine-tenth second. The next group of outputs will provide pulses which occur at one second intervals. Only one output is needed for pulses which occur every 1,000 seconds.

Manually controllable switches (MSS) 40, 42 and 44 are used to select groups of combinations of outputs from the BCD to decimal converters 38. The selected outputs are applied to AND-gates 46, 48 and 50 to produce timing signals which occur at selected intervals. the output of the AND-gate 46 connected to the first MSS 40 will be a pulse occurring at any one-tenth second interval from one-tenth second to 99.9 seconds which is selected by the MSS 40. Similarly, the outputs of the AND-gates 48 and 50 which are connected to the MSS 42 and 44 may be a pulse occurring at any one-tenth second interval from one-tenth second to 1999.9 seconds. These pulses are applied to and stored in flip-flops 52, 54 and 56. When the flip-flop 52 is set, an enable travel command is applied to drive control system 28 (FIG. 1) so as to start the motor which drives the work 12. Similarly, after the time delay selected by the MSS 42, the flip-flop 54 will be set and will apply an enable command to the current control system 24 which will cause the system to apply a control signal to the welding power supply 18 so as to change the magnitude of the welding current. This change in welding current magnitude is referred to herein as a "current step." At the end of the welding cycle as preset by the MSS 44, the flip-flop 56 will be set and enable a slope command. This slope command is applied to the current control system and causes the welding currents to be decreased gradually until the arc is extinguished. The enable slope command is also applied to a NAND-gate 58, together with the output of the flip-flop 52 which is complementary to the output which produces the enable travel command. The NAND-gate 58 output is inverted in an inverter 60. By virtue of the logical function of the NAND gate and the inversion of its output, the enable height lateral oscillation and wire feed command will be produced only when the flip-flop 52 is set and the enable slope command is not present. The presence of the enable slope command inhibits the enable height, lateral oscillator and wire feed commands, thereby stopping the wire feed and lateral and vertical oscillation of the torch and moving it away from the work. This is accomplished by means of logic circuits in the welding power supply and vertical oscillator control system to be described in connection with FIGS. 5 and 6. A slope level detector (not shown) in the current control system 24 generates a clear pulse when the control current generated in response to a slope command decreases to the level requisite for system shutdown. This pulse resets the flip-flops 52, 54, 56 and the counters 34, 36.

Other outputs (not shown) may be taken from the BCD to decimal converters 38 via additional manual selection switches (also not shown) to control other functions in the automatic welder, such as the duration of the starting current which is produced by the current control system 24, and gas preflow and postflow before and after the welding cycle; the latter being obtained by commands applied to the water and gas control system 20 (FIG. 1).

Figure 3:
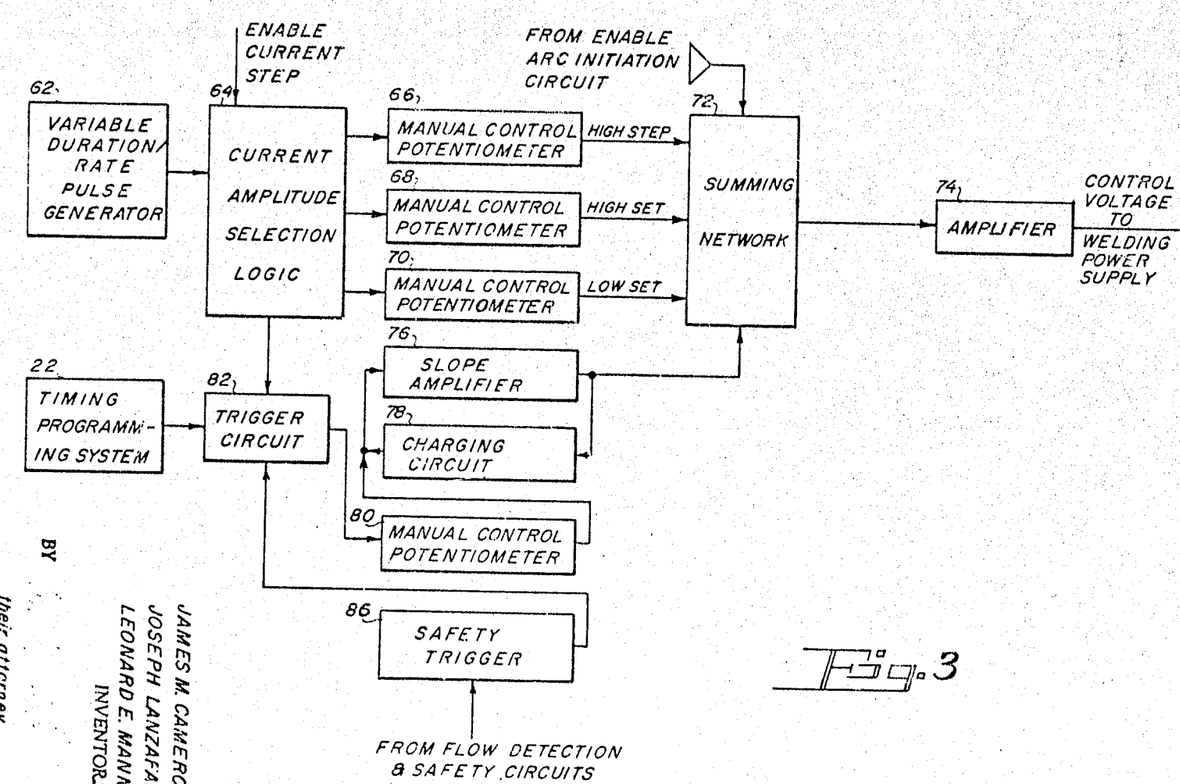
FIG. 3 is a more detailed block diagram of the current control system shown in FIG. 1.

The current control system 24 is schematically depicted in the simplified block diagram of FIG. 3. The purpose of the current control system is to generate a control voltage for the welding power supply 18. During normal welding operation, this control voltage is in the form of pulses which are generated by a pulse generator 62 which may be controlled to produce the pulses with different selected rates and durations. A typical pulse rate may be of the order of 2½ Hz. A typical pulse duration may be 100 milliseconds during which the pulse is on or of high level, and 300 milliseconds during which the pulse is off or of low level. The pulse generator 62 itself may comprise a pair of one-shot multivibrators, each of which has an adjustable time constant so as to select the pulse durations and rate. The one-shot multivibrators are connected in a loop circuit so as to be free running. In the even that a constant high-level or low-level control voltage is desired to be supplied to the welding power supply so as to obtain a constant current arc, rather than a pulsed arc, a control circuit may be associated with the pulse generator to inhibit free running of the pulse generator and to condition the generator output to remain either at high or at low level.

The generator output signal is applied to the current amplitude selection logic network 64 consisting of a suitable combination of digital gates. Also applied to this logic network 64 is the enable current step command from the flip-flop 54 in the timing programming system 22 (FIG. 2). The current amplitude selection logic network provides outputs selectively to three different manually controllable potentiometers (MCP) 66, 68 and 70, depending upon the absence or presence of a high-level or low-level pulse signal and the absence and presence of the enable current step command. In the absence of the enable current step command, the selection logic network 64 applies low-level pulses to the MCP 70 and the high-level pulses to the MCP 68. The presence of the enable current step command and the high-level pulse signal provides an output to the MCP 66. In other words, the selection logic performs an exclusive OR operation in selecting the MCPs 68 or 70 which independently vary or set the amplitudes of the level portions of each pulse cycle. The output of the MCP 68 is therefore labeled "high set," while the output of the MCP 70 is labeled "low set." The output of the MCP 66 is labeled high step since it provides an independent current level which may be higher or lower than the selected "high set" level. The actual amplitudes of the low-set, high-set and high-step signals may each be independently set on their respective MCPs 70, 68 and 66 prior to welding operations to obtain the necessary current pulse characteristics.

In order to generate the requisite control voltage during arc initiation, an amplifier (not shown) which produces a preset output level when an enable arc initiation command is applied thereto may be also provided in the current control system. Circuits in the timing and programming system provide the enable arc initiation command a preset time after the start switch is operated to allow time for gas and water flow to be established.

The output of the last-mentioned amplifier, together with the outputs of the MCPs 66, 68 and 70 are applied to a summing network 72, which may be a resistor matrix, in order to develop the current control signal. This control signal is applied to a DC amplifier 74 and supplied as a control voltage to the welding power supply.

The summing network 72 also receives an input signal from a slope amplifier 76. The slope amplifier is an integrating amplifier and generates a slope signal by charging the capacitor in its feedback circuit, or charging circuit 78. An MCP 80 is connected to the charging circuit 78 so as to control the charge time constant and therefore rate of change of the slope voltage which is produced by the slope amplifier 76. A trigger circuit 82, such as an FET (field-effect transistor) gate is turned off to allow the charging circuit 78 to charge upon the receipt of a slope initiate command. the flow detection and safety circuits can also command a slope.

It will be recalled that the slope initiate command is provided at the end of a normal welding cycle. Slope control voltages may, however, be generated under other circumstances. For example, in the event that there is a failure in the gas or water supply system 20 (FIG. 1), detector circuits in that system provide outputs which operate a safety trigger circuit 86. This circuit will also cause a slope initiate command and may include additional resistors so as to insure the necessary rate of change (slope-out) of the welding current.

Figure 4:
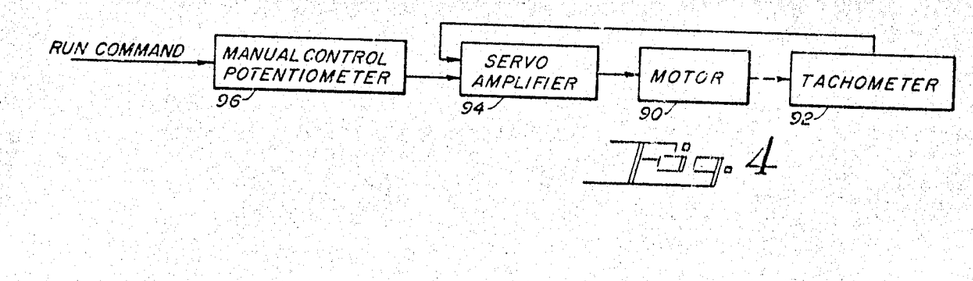
FIG. 4 is a block diagram showing a portion of the drive control system shown in FIG. 1.

The drive control system 28. (FIG. 1) may include a motor control system, such as shown in FIG. 4 for the travel motor which drives the work, as well as for the wire feed and lateral oscillation drive motors. Each of these drive systems includes a DC servomotor, such as the motor 90, shown in FIG. 4. A tachometer 92, which is coupled to the shaft of the motor, provides a feedback signal to a servoamplifier 94 which may be a direct current amplifier which provides an amplitude-controlled DC drive signal to the motor 90. The amplitude of this drive signal from the output of the servoamplifier is controlled by an MCP 96. A run command which is associated with the motor 90 is applied to the input of the MCP 96. Thus, when the run command is not present, the servoamplifier will produce no operating current for the motor 90 and the motor 90 will stop. The presence of a run command therefore enables the operation of the drive mechanism and the absence of the command inhibits such operation.

Figure 5:
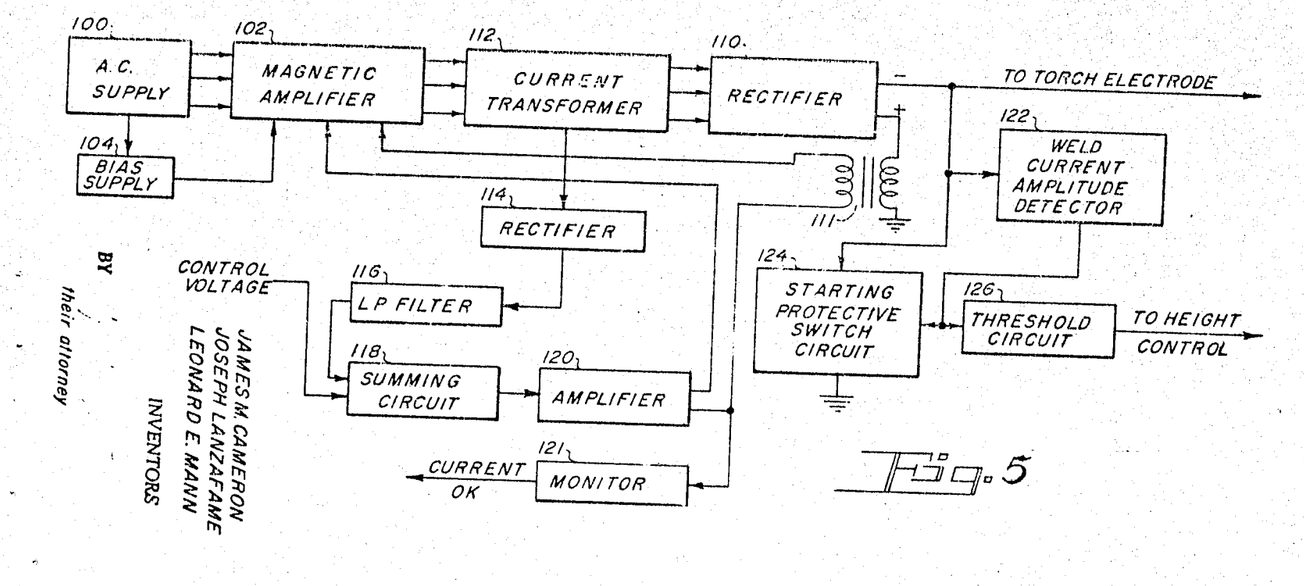
FIG. 5 is a block diagram of the welding power supply system showing means for generating the welding current and protecting the torch and work, both during arc initiation and welding operations.

The welding power supply 18 is shown in FIG. 5. It includes a three-phase alternating current supply 100 provided by a three-phase transformer which is connected to the line via the electromagnetically operated actuators which pull in when the start button is pressed and dropout at the end of the welding cycle, as was explained in connection with FIG. 1. The AC supply 100 feeds a three-phase magnetic amplifier 102 having bias, control and output windings. DC bias for the bias winding is obtained from a bias supply rectifier circuit 104 coupled to the AC supply. Terminals are connected to opposite ends of the control windings. The output windings are connected through current transformers 112 to rectifiers 110 which provide the welding current across negatively and positively polarized output terminals. The negative terminal is connected to the torch electrode, while the positive terminal is connected, after passing through the primary winding of a rate feedback transformer 111, to the work which is desirably grounded.

Current feedback is obtained from current transformers 112 which are inductively coupled to each of the three phase lines from the magnetic amplifier 102 to the rectifiers 110. The current transformers outputs are rectified in diode bridge rectifying circuits for example, which constitutes the rectifier 114. The rectified output voltage is passed through a low-pass filter 116 to remove the ripple component thereof, and is applied through a summing circuit 118 which may be a resistive matrix, together with the control voltage from the output amplifier 74 of the current control system (FIG. 3). The DC current feedback from the rectifiers 114 is opposite in polarity to the control voltage so as to stabilize the welding current which is produced to the current which is preset or ordered by the control voltage. The output of the summing circuit is connected to a DC amplifier 120. The output of the amplifier is connected across the magnetic amplifier control winding in series with the secondary of the rate feedback transformer 111 which applies a predetermined level of the ripple voltage in opposite phase to effect the cancellation thereof. It also is fed to a monitor 121 which determines if it is within a predetermined acceptable range. A current OK signal is the output.

Inasmuch as the control voltage will normally be a pulse train, the welding current will consequently also normally be in the form of pulses. The DC amplitude of the current, however, may readily be detected by a weld current amplitude detector 122. This detector 122 provides separate outputs to a protective switch circuit which provides a short circuit between the torch electrode and the work during starting of the arc in order to protect both the electrode and the work. The other output from the amplitude detector is applied to a threshold circuit 126 which enables the height control (viz the vertical oscillation of the torch) when the welding current is greater than a predetermined magnitude, say 27 amperes.

Figure 6:
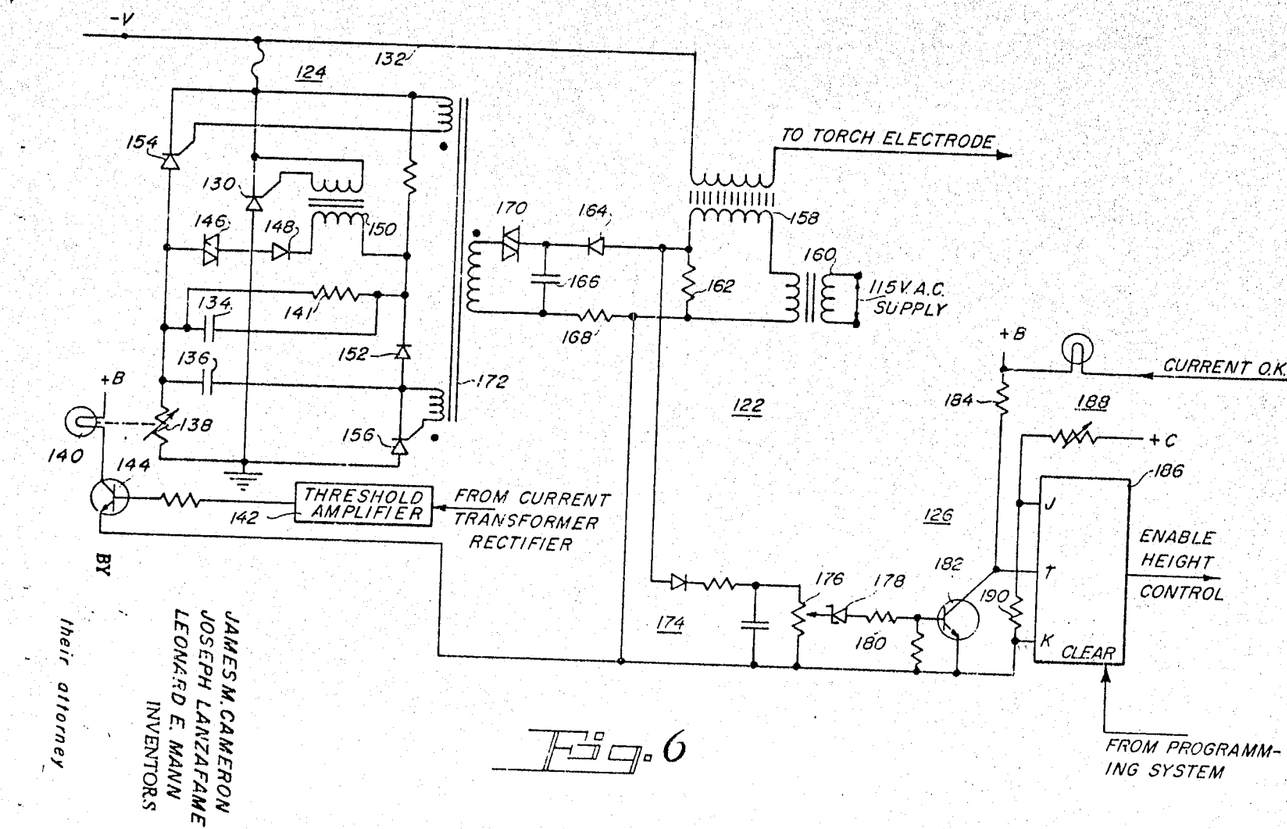
FIG. 6 is a schematic diagram, partially in block form, of the circuits which control the initiation of the arc.

The protective switch circuit 124, the amplitude detector 122 and the threshold circuit 126 are shown in detail in FIG. 6.

The starting protective switch circuit 124 prevents current flow from the torch electrodes to the work until the current transient disappears and conditions are right to form an arc. This circuit, as shown in detail in FIG. 6, contains a main silicon control rectifier (SCR) 130 which is connected in series with a fuse across the welding current supply line 132 from the rectifier to the torch electrode. When the welding supply is turned on, the voltage between the line and ground is substantially full magnitude, typically 80 volts. The voltage charges a pair of capacitors 134 and 136. The capacitor 134 has a resistor 141 connected thereacross in order to prevent retriggering of the SCRs in the circuit 124, as will be explained more fully hereinafter. These capacitors 134 and 136 are permitted to charge only during starting by reason of the light dependent resistor 138 which is connected in their charging current paths. This resistor is illuminated by a lamp 140 only at such time as the current being supplied by the welding power supply is low, say below 6 amperes. This current is detected by means of a threshold amplifier 142 which is connected to the rectifiers 114 in the welding power supply (see FIG. 5). So long as the threshold is not exceeded, a transistor 144 is operated to its conductive state. When the lamp 140 goes off, as occurs when the welding current exceeds the 6 amperes level, the resistance presented by the light dependent resistor 138 is high and effectively presents an open circuit. The slight voltage drop across the resistor 141 is too low to permit the capacitor 134 to charge to a level sufficient to generate a triggering voltage for the SCR 130.

During starting, however, the capacitor 134 soon attains its full charge which is sufficient to obtain breakdown in a silicon-controlled switch 146. This switch is also known as a "Diac"; Diac being a trade name of the General Electric Company. Current from the discharge of the capacitor 134 therefore flows through the Diac, experiencing a small voltage drop therein, and thence through a diode 148 and the primary of a transformer 150. The pulse which is generated upon breakdown of the Diac is translated through the transformer 150 to the trigger electrode of the main SCR 130, causing it to break down. Thus, a short circuit is established. The capacitor 136 cannot discharge through the circuit containing the Diac 146, diode 148 and transformer 150 in view of the polarization of a diode 152 which is in series with the capacitor 136 in this circuit.

When the current to the short circuit (SCR 130) reaches 6 amperes, approximately, the signal from the current transformer rectifier 114 (FIG. 5) exceeds the threshold set in the amplifier 142. Thus, the lamp 140 is extinguished and the resistance of the light dependent resistor 138 increases to its open circuit value. The weld current amplitude detector 122 is operative to cause the breakdown of a pair of secondary SCRs 154 and 156, thereby providing a discharge path for the capacitor 136. This discharge path is completed through the conductive primary SCR 130. However, the current flow from the capacitor 136 is in a direction opposite to the current flow between the line 132 and ground. In other words, a bucking voltage to the voltage to which the capacitor 136 is charged opposes the voltage tending to sustain the breakdown of the primary SCR 130. The SCR 130 is thereupon cut off removing the short circuit between the torch electrode and the work. Upon the discharge of the capacitor 136, voltage which sustains the conduction through the secondary SCRs 154 and 156 is also no longer present, thereby causing these SCRs to become nonconductive.

After a predetermined preflow time, and if the current and voltage of the welding power supply output are normal the height control is energized and the torch drives to touch the work. The current now begins to flow through a saturable transformer 158.

The weld current amplitude detector 122 contains saturable transformer 158 which controls the current flowing around a circuit including the secondary of a transformer 160 and a resistor 162. The transformer 160 is connected across the alternating current supply line. Therefore, as the saturable transformer 158 becomes partially saturated due to the torch touching the work, the voltage drop thereacross decreases the voltage appearing across the resistor 162 increases. The voltage across the resistor 162 is rectified by a half wave rectifier circuit including a diode 164 and a capacitor 166. A resistor 168 completes the rectifier circuit. The voltage developed across the capacitor 166 in the rectifier circuit is sufficient to break down a Diac 170 when it reaches a value corresponding to a current flow through the line 132, equal to approximately 6 amperes. Breakdown of the Diac sends a current pulse through the primary of a transformer 172, the secondary windings of which are connected to the trigger electrodes of the secondary SCRs 154 and 156. Thus, these SCRs then fire to remove the short circuit.

The weld current amplitude detector also includes another half wave rectifier circuit 174 which is connected across the resistor 162. The voltage developed across this amplitude detector appears across a potentiometer 176 which is part of the threshold circuit 126. The threshold circuit itself includes a zener diode 178 which is connected through a coupling resistor 180 to the base of a transistor 182. When the threshold is exceeded, the zener diode 178 conducts, causing the transistor 182 to conduct. The voltage level at the collector of the transistor 182 is used to trigger a JK flip-flop 186 which enables the vertical oscillation drive or height control mechanism to pull the torch away from the work, thereby starting the arc. To this end, the threshold at which the transistor 182 becomes conductive may be adjusted so that the proper starting current (e.g., 27 amperes) is at that time flowing through the torch. The threshold circuit 126 also actually measures the current to the torch by virtue of being connected to the weld current amplitude detector 122. Thus, there is reasonable assurance that the proper welding current is flowing through the torch at the instant when starting is desired. Starting, as well as vertical oscillation, is under the control of the programming system and cannot occur until the enable height command from the inverter 60 (FIG. 2). Flip-flop 186 can be toggled if the J input is high. The J input is high if the torch current is within normal limits. This is to prevent possibly burning a hole if the current is very high, as the torch lifts from the work. If the current in the torch is normal, a ground excites lamp cell 188, thus changing the light dependent resistor therein to its minimum value. This low resistance now makes the J input high. The necessary voltage levels are determined by the voltage division accomplished by resistor 190 and the light dependent resistor in cell 188. The clear input to the flip-flop is low to clear the flip-flop and high to enable. When the electromechanical actuator is actuated, the level to the flip-flop 186 is high. When the actuator is deenergized the level is low.

Figure 7:
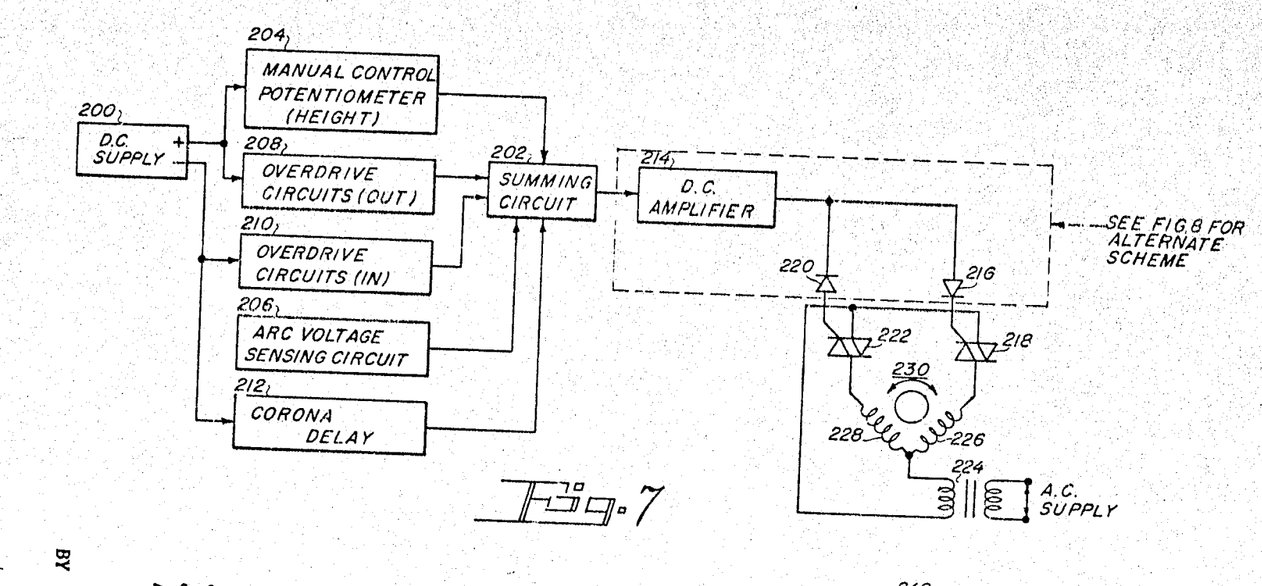
FIG. 7 is a block diagram of the vertical oscillation control system schematically showing the circuit for controlling the vertical oscillation drive motor.

The vertical oscillation control system is illustrated in greater detail in FIG. 7. It includes a source of direct current operating voltage indicated as being a DC supply 200. The amplitude of the oscillation is controllable by adjusting the positive value of the voltage which is applied to a summing circuit 202 which may be a resistor matrix. This control over this voltage is obtained by a manually controllable potentiometer 204 which may have separate sections so as to vary this voltage in coarse and fine steps. The voltage between the torch and the work (viz the arc voltage) is sensed by an arc voltage sensing circuit 206. The polarity of this voltage is opposite to the polarity of the voltage applied from the supply to the summing circuit 202 via the MCP 204. Overdrive circuits 208 and 210 which provide voltages of opposite polarity to drive the torch, respectively, out or away from the work, and in or toward the work are also provided, principally for starting purposes. Another circuit is provided indicated as being a corona delay circuit 212. This circuit applies an overriding voltage to the summing circuit during the short time interval immediately after a voltage drop appears between the torch and the work, until the effective corona resulting from that drop have time to dissipate. The output of the summing circuit controls a DC servoamplifier 214.

The summing circuit output to the amplifier may be considered as a control voltage which varies in amplitude and sense in accordance with the direction in which it is desired to move the torch. When the voltage is 0, no torch movement is, of course, desired. When the voltage increases in one sense, say positive, it is applied to a diode 216 to trigger a solid state switch 218 of the type known as a "Triac." Triac is a trademark of the General Electric Company for such solid state switches. Similarly, if the error voltage amplified by the DC amplifier 214 is of the opposite or negative polarity, current corresponding thereto passes through an oppositely polarized diode 220 and triggers another Triac 222. The Triacs switch the alternating current flow from a transformer 224, which is connected across the alternating current line, through either of the split phase windings 226 and 228 of the servomotor 230. The shaft of the motor therefore may turn in opposite directions, causing the vertical oscillation drive mechanism which is coupled thereto to oscillate. This oscillation is principally a function of the pulsating arc current as sensed by the arc voltage sensing circuit 206.

Figures 9, 10, 11, 12:
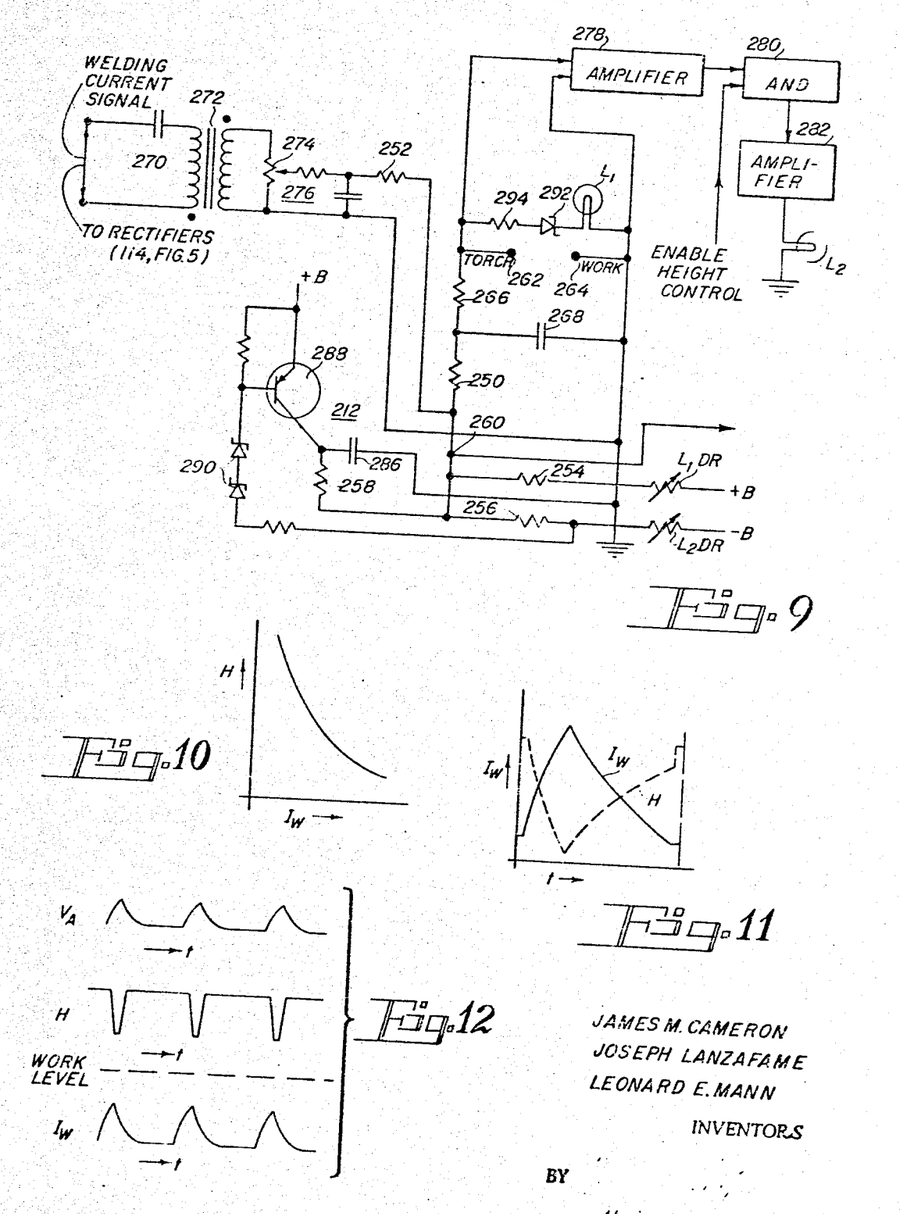
FIG. 9 is a schematic diagram, partially in block form, showing some of the circuits depicted in FIG. 7 in greater detail.
FIG. 10 is a graph showing a relationship between current and arc length which is obtained by means of the system shown in FIGS. 7-9.
FIG. 11 is a graph showing the variation of arc current and arc length with time.
FIG. 12 are waveforms illustrating the interrelation of variation of arc voltage, arc length, and arc current with time.

The curves shown in FIGS. 10, 11 and 12 illustrate this variation in arc current ($I_a$) and the consequent variation of the height (H) of the torch over the work.

FIG. 10 illustrates the variation of height with arc current which occurs when the arc voltage is maintained constant is accomplished by means of the servosystem shown in FIG. As the arc current increases, the arc voltage tends to follow this increase. Thus the variation in the height of the torch reason of the control system shown in FIG. 7 tends to decrease the height (viz the height is an inverse function of the current). This relationship is shown in FIG. 11. The pulsating current which is produced by the current control system therefore tends to produce with a slight delay a pulsating voltage, as shown in FIG. 12. The oscillations in the height the torch with respect to the work follow this arc voltage shown in FIG. 12. A uniform oscillation therefore is produced by reason of the vertical oscillation control mechanism a circuits because the current control system produces current pulses which force such oscillation. Without such current pulses, oscillation would not be produced. Such oscillation is important parameter in controlling the formation of the we The system provided by the invention and the method of t invention is to produce such oscillations and then control them to obtain the desired weld characteristics.

Figure 8:
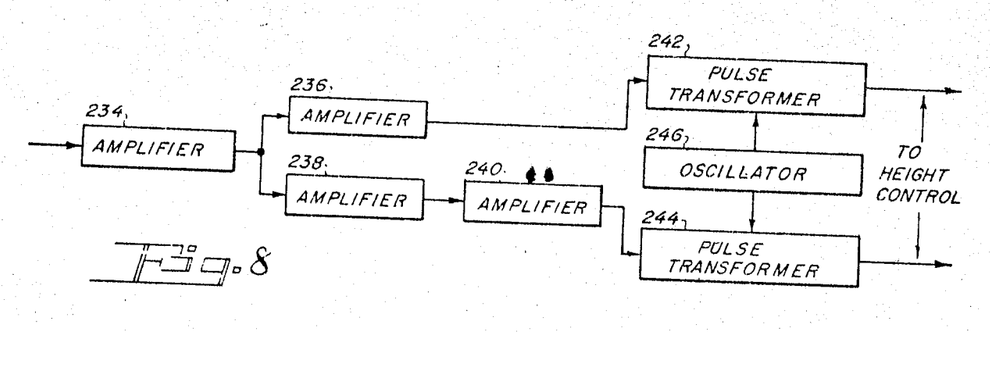
FIG. 8 is a block diagram of a portion of another system for controlling the vertical oscillation motor.

In the alternative embodiment of the vertical oscillator control system, shown in FIG. 8, the output of the summing circuit 202 is amplified in an amplifier 234 which is similar to the amplifier 214. The output of this amplifier 234 is divided into two channels, one of which contains a single amplifier stage 236 while the other contains a pair of stages 238 and 240 connected in tandem. Thus, the output of the amplifier 236 will be 180° out of phase with respect to the output of the amplifier 240. These signals are applied as gating signals to pulse transformers 242 and 244. The pulse transformers gate signals from an oscillator 246 which provides a constant frequency output signal, which is desirably in the range of 600 Hz. to 2 kHz. to the motor control system. This motor control system may contain Triacs, such as the Triacs 218 and 222 which are separately triggered by the outputs of the pulse transformers depending upon which of the transformers receives a control signal of proper polarity to enable the transmission of the oscillation therethrough. The distance which the torch moves away and then towards the work depends, of course, upon the duration of the control signal which is applied to the pulse transformers 242 and 244. Inasmuch as the frequency of the oscillator 246 is relatively high, the movement of the torch in any direction occupies a number of cycles of the oscillator frequency and therefore is essentially continuous.

The summing circuit 202 is shown in FIG. 9 as comprising a matrix of resistors 250, 252, 254, 256 and 258 which are connected to a common node or summing point 260. The torch itself is connected between the terminals 262 and 264, with the electrode of the torch (which is maintained at a negative potential) connected to the terminal 262, while the work or ground terminal corresponds to the terminal 264.

The resistor 266 and capacitor 268 connected between the torch and its summing resistor 250 provide filtering of the powerline frequency component which appear at the torch electrode. A resistor-capacitor network 270 is connected across the output of the rectifiers 114 and provides the adjustable signal to the summing point 260. this adjustable signal may be varied from zero to a maximum level by potentiometer 274. With potentiometer 274 at zero, the vertical oscillation is maximum and inversely proportional to arc current. conversely, with potentiometer 274 at a maximum the vertical oscillation is maximum, but the motion is now in phase with the arc current, i.e., when the current increases the arc length increases. Another feature of this control is that when potentiometer 274 is at its center position, the vertical oscillation can be completely cancelled, and pure arc voltage control is obtained.

The voltage appearing across the torch terminals 262 and 264 is amplified in a threshold amplifier 278 which provides an output for enabling an AND-gate 280 when the arc voltage is above a certain level indicating that an arc can be maintained or is already present. The AND gate, however, is not conditioned to provide the desired logical output level, unless and until a weld current present command (viz. 6 amperes welding current) is obtained from the flip-flop 186 (FIG. 6) which is triggered when the current control voltage and proper welding current amplitude is present and the programming system has also provided a command to enable height control. With the logical command present at the input to the AND-gate 280, an output is provided which inhibits a lamp driving amplifier 282 which provides enabling current to a lamp L2 linked to a light dependent resistor $L_2DR$ which is connected between a source of negative potential indicated as $-B$ and the summing matrix resistor 256. Accordingly, the lamp L2 is normally illuminated, thereby lowering the resistance of the resistor $L_2DR$ so that a negative potential may be applied to the summing point 260. This negative potential provides a "drive-in" command and so long as it is maintained keeps the torch in contact with the work. Sufficient resistance is present in the electrode material of the torch to provide the voltage level necessary to operate the threshold amplifier 278. It will be recalled also, that the SCR 130 (FIG. 6) provides a short circuit across the terminals 262 and 264 until the welding current is sufficient to start and maintain the arc. This provides an additional safety feature which militates against improper starting which could cause incomplete melting or sputtering with consequent damage to the work. As soon as the arc current is present and the other conditions for arc starting and maintenance of vertical oscillation exist, the lamp L2 is extinguished, thereby preventing the application of the negative voltage from the source at $-B$. A positive voltage is, however, applied to the summing point from the MCP 204 (FIG. 7) thereby permitting the torch to move away from the work so as to start the arc and maintain it under the control of the vertical oscillation control system such that the torch will execute the vertical oscillations in response to the pulsating control current, as was explained in connection with FIGS. 10-12.

In order to preclude starting until the dissipation of corona effects, the corona delay circuit 212 includes a capacitor 286 which is charged through the transistor 288 when the light dependent resistor $L_2DR$ is illuminated. When $L_2DR$ is extinguished, the potential maintained by a pair of zener diodes 290, which had previously biased the transistor 288 to conduction, is cut off. The capacitor 286 then discharges through the summing network resistor 258 and applies a positive potential to the summing point 260 for a time sufficient to preclude downward movement of the torch toward the work until the corona effects dissipate. Accordingly, vertical oscillation is inhibited for a short period of time, thereby preventing possible damage to the work due to corona effects.

A zener diode 292 which is connected in series with a resistor 294 and a lamp $L_1$ linked to the light dependent resistor $L_1DR$ across the torch and work electrodes 262 and 264 provide a safety threshold so as to drive or maintain the torch away from the work if the weld voltage exceeds a certain safety threshold. The light dependent resistor $L_1DR$ is therefore normally extinguished until the safety threshold is exceeded. Thereupon, a positive voltage is applied via the summing matrix resistor 254 to the summing point which drives or maintains the torch in an upward position away from the work.

It will therefore be seen that the system of circuits so far described provides the control signals which automatically drive the torch with respect to the work. The mechanisms which are responsive to the control signals operated by the motors which are described in connection with the vertical oscillation and drive control systems are shown in FIGS. 13-20 of the drawings.

Figure 14:
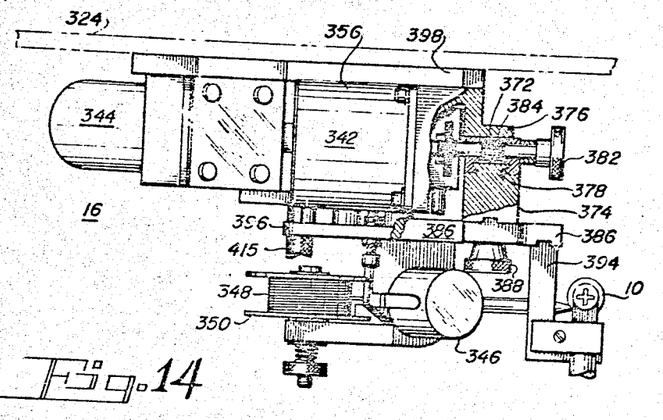
FIG. 14 is the top view of the mechanism shown in FIG. 13.
Figure 15:
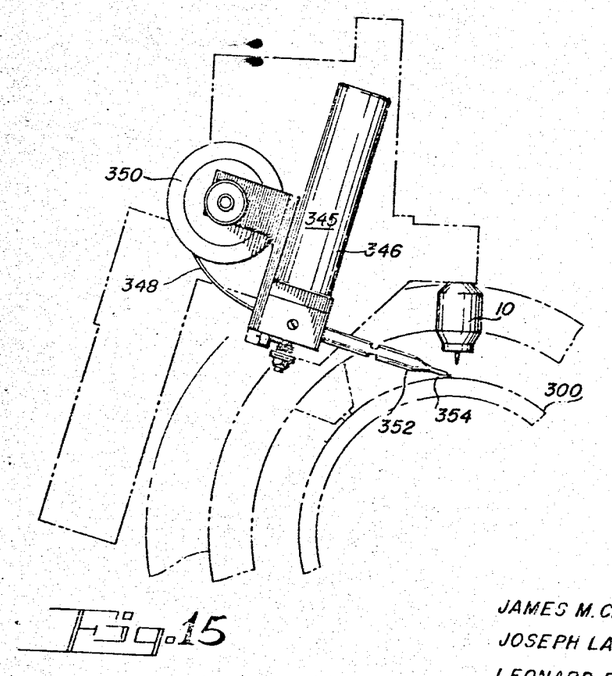
FIG. 15 is a view similar to FIG. 13, but showing the filler wire feed mechanism in greater detail.

Referring first to FIGS. 13 and 14, the work to be welded is shown as a section of pipe 300 which may have a large diameter, say of the order of 15 inches. A carriage 302 is clamped to the pipe 300 by means of feet 304 which engage the outer diameter of the pipe at four diametrically opposed points. These feet 304 are shown in greater detail in FIG. 20. The carriage portion on which the feet 304 are mounted is made up of two semicircular sections 306 and 308. These sections are pivotable away from each other about a pivot pin 310. The junction 312 of the sections 306 and 308 which come together when the carriage is clamped on the pipe 300 is provided with latches 313 and a clamp 315 which hold the sections 306 and 308 in clamped relation on the pipe.

Figure 20:
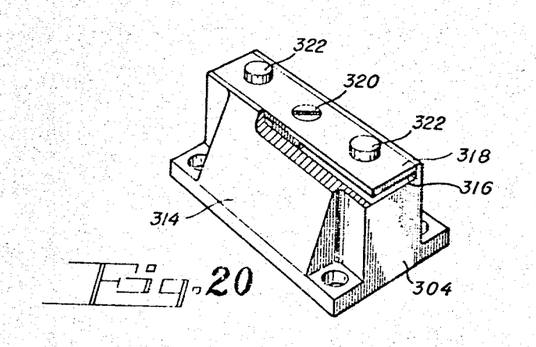
FIG. 20 is a perspective view of one of the work supports which is shown in FIG. 13.

The feet 304, as shown in FIG. 20, is made up of a stanchion 314 which is screwed into the carriage 302. The upper portion of the stanchion has a slot 316 therein in which a flat spring 318 is secured by means of a screw 320. The spring 318 is mounted on a block spacer to provide clearance. A pair of buttons 322 actually engage the pipe. When the carriage sections 306 and 308 are closed, the spring plates locate themselves into the slots 316 and the proper amount of tension is supplied to the pipe to hold the carriage firmly in position without damage to the exterior walls of the pipe and to take care of heat expansion of the pipe.

The welding torch 10 and the portion of its drive mechanism 16 which provides for vertical and lateral oscillation thereof in a direction towards and away from the pipe and also in a direction along the axis of the pipe, are mounted on a yoke 324 which in turn is mounted on a flange portion 326 of a split worm gear which is located in a slot in the carriage 302 and rotates around the pipe 300 as the worm gear is driven. A travel motor 328 and its associated worm gear mechanism 330 is secured to the carriage 302 by means of bolts 332 which extend through holes in the mechanism 330. Thumbscrews 334 hold the worm gear mechanism 330 and its associated motor 328 so that the worm in the mechanism 330 engages the worm gear part of the flange 326. Accordingly, the worm may be disconnected from the worm gear so as to facilitate the adjustment of the angular position of the pipe 300 with respect to the carriage 302. The split gear carriage drive mechanism consisting of the worm 330, flange worm gear and travel motor 328, may be of a construction similar to that described in U.S. Pat. No. 3,389,846, issued June 25, 1968. Reference may be had to that patent for a detailed description and showing of a suitable carriage drive mechanism.

In order to facilitate the fastening of the yoke to the flange 326, the edge 336 of the yoke 324 is beveled and is inserted into a complementary beveled slot in the periphery of the flange 326. a pair of setscrews 338 are located near the ends of the yoke and hold the yoke in position in the flange 326. In addition, another setscrew 340 extends through the end of the flange 326 and through the yoke's tapered edge 336 to firmly hold the yoke and the drive mechanism 16 mounted thereon in position for rotation about the pipe 300.

The principal parts of the drive mechanism 16 which are mounted on the yoke 324 are the vertical oscillation mechanism 342, the lateral oscillation mechanism 344 and the wire feed mechanism 345. The wire feed mechanism 345 is shown in greater detail in FIG. 15. It includes a drive motor 346 which drives a pair of pinch rollers between which filler wire 348 is pulled from a reel 350 and driven through a tubular guide tip 352. The end 354 of the tip 352 is flexible. Accordingly, when the torch 10 is lowered to the pipe 300 during starting of the arc, the torch housing engages the tip and bends it out of the way so that there is no interference or inadvertent contact of the torch electrode with the wire 348. When the torch is raised to normal position, the tip returns to the proper position for feeding wire into the joint being welded.

Figure 16:
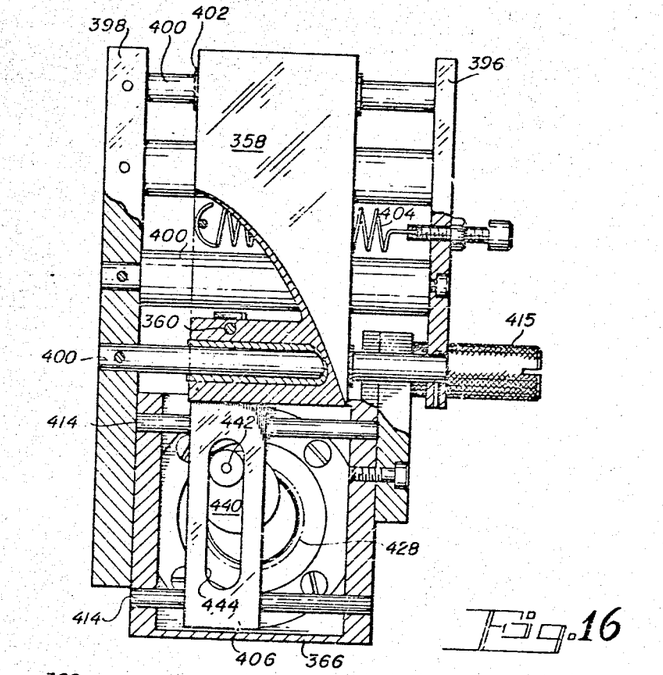
FIG. 16 is a plan view, partially in section, of a portion of the mechanism shown in FIG. 13 which illustrates the lateral oscillator drive mechanism in detail.
Figure 17:
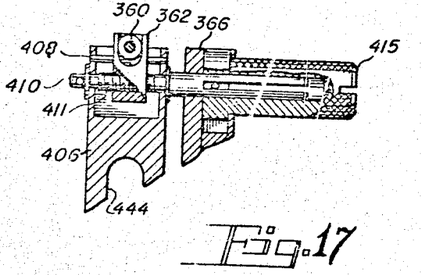
FIG. 17 is a fragmentary sectional view similar to FIG. 16, but showing a portion of the mechanism depicted therein in greater detail.

The entire drive mechanism 16 is fastened to the yoke 324 by means of screws (not shown) which extend laterally through the yoke. The vertical oscillation mechanism 342 includes a drive motor 356 which is fastened to a platform 358 which is oscillated laterally by the lateral drive mechanism 344. Coupling between the platform 358 and the lateral drive mechanism 344 is accomplished by means of a pin 360, fixed to the platform 358, which extends downwardly from the platform 358 into engagement with a laterally oscillatory slotted member 362 which forms part of the lateral oscillating mechanism 344. The pin and slotted coupling member 362 are shown in FIGS. 16 and 17 and will be discussed in greater detail in connection with these figures. The lateral oscillator mechanism itself includes a drive motor 364 and a motion translating mechanism 366 which converts the rotary motion of the motor 364 into controllable amplitude lateral oscillations so as to drive the pin 360 and the platform 358.

The shaft 368 of the motor 356 has a gear at the end thereof which drives a spur gear 370. The spur gear 370 drives a pinion (not shown) mounted on the same shaft as the gear 370. This pinion drives a rack gear 372 which is connected to a slide 374 which is connected to a bracket 376 by means of a dovetail coupling 378 which slides in a slot 380 in the bracket 376. Thus, as the motor rotates, the slide 374 will move up or down, depending upon the sense of motor rotation. The position of the slide 374 may be adjusted manually by means of a knob 382 which is carried with the slide 374. The end of the knob which extends through the slide 374 has a gear 384 which is easily rotated by rotating the knob 382. This gear engages the rack gear 372. Thus, by turning the knob 382, the position of the slide may be adjusted. A worm-worm gear drive may be used to drive the slide 374 up and down. A rack gear arrangement, as shown, is however preferable since its parts are lower cost and reliable.

A bracket 386 is attached to the slide by means of a hold down knob 388 which is carried on a bolt extending from the slide 374 through a slot 390 in the bracket 386. The torch 10 is carried on an L-shaped bracket 394 which is also secured in the bracket 386 which moves with the slide 374. The wire feed mechanism 345 is also fastened to the bracket 386.

Reference may be had to FIGS. 16 and 17 for a view of the platform 358 and the translation mechanism 366 for laterally oscillating the platform 358. The platform 358 is slideably mounted between two sideplates 396 and 398. The sideplate 396 is also shown in FIGS. 13 and 14. The back sideplate 398 is fastened to the yoke 324, as shown in FIG. 14. The sideplates are spaced from each other by means of posts 400. Bushings 402 in the platform are provided so that the posts 400 guide the movement of the platform 358 from side to side between the sideplates 396 and 398. The platform 358 may be biased by means of a spring 404 towards the sideplate 396. This spring is designed to counteract the weight of the torch, vertical oscillation motor and other equipment supported by the platform 358 should the mechanism be positioned such that the platform 358 must move up and down rather than horizontally as shown in the drawings.

The translation mechanism 366 is coupled to the platform 358 by means of a slotted bar 406 which is laterally oscillated by the mechanism 366. This bar has a bifurcated end 408 through which extends a threaded pin 410 on which the slotted coupling member 362 is located. This pin carries threads 411 engaging the threaded coupling member 362. By rotating a knob 415 (see also FIG. 1), threaded coupling 362 is carried by the threaded pin 410 as it rotates, thereby adjusting the position of the threaded coupling member 362.

The pin 360 which depends from the platform 358 is located in the slot in the coupling member 362. Accordingly, by rotating the knob 415, the center of the oscillatory path of the platform 358 and therefore of the torch can be set. This cross seam adjustment is especially desirable in that it selects the portion of the joint over which the oscillation takes place. As will be described hereinafter, the amplitude of the oscillation is adjustable by means of the translating mechanism 366.

Figure 18:
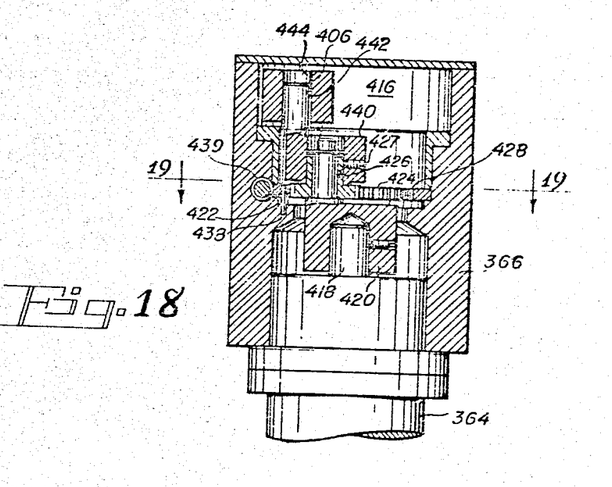
FIG. 18 is an elevational view, partially in section of the lateral oscillator mechanism shown in FIG. 16, but in a different position from that shown in FIG. 16.
Figure 19:
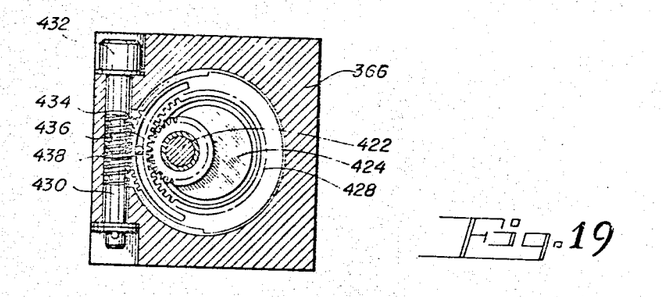
FIG. 19 is a sectional view taken along the line 19-19 in FIG. 18.

The translating mechanism is shown in FIGS. 18 and 19 as well as in FIG. 16. It will be recalled that the slotted bar 406 is coupled to the coupling member 362 so that the lateral oscillation thereof can be translated to the platform 358 via the pin 360 which depends from the platform. The slotted bar 406 is slideably mounted on a pair of pins 414 and is translated from left to right as shown in FIG. 16 by a mechanism of gears, cranks and pins 416 (FIG. 18). In this mechanism 416 the shaft 418 of the motor 364 is attached to a crank 420, the arm 422 of which rotates about the axis of the shaft 418 as the shaft 418 is rotated. A pinion 424 having a collar 426 is mounted on the arm 422 so that it may rotate freely. The pinion 424 meshes with an internal gear 428 having a gear ratio with respect to the pinion 424 of 2:1. This internal gear 428 also has an external thread which meshes with a worm 430. The worm 430 may be turned by means of the slotted head 432 thereof so as to rotate the internal gear 428. The limits of such rotation are established by means of a pin 438 and a slot 436 in the internal gear 428. Another crank 440 is fastened to the collar 426 by means of a setscrew 427 so that the crank 440 rotates therewith. The arm of the crank 440 is in the form of a pin which fits into the slot 444 in the slotted bar 406.

By turning the internal gear 428 with the worm 430, the angle of reciprocation of the crank 440 may be adjusted. Thus, when the motor 364 rotates, the amplitude of lateral oscillation of the pin 442 may be decreased from the maximum amplitude of oscillation thereof. Such maximum amplitude of oscillation is obtained when the internal gear is in the position shown in FIG. 19 of the drawings. This amplitude may be decreased to zero by rotating the angle of reciprocation of crank 440 to vertical in FIG. 16.

While the gear mechanism 416 is preferred inasmuch as it provides very fine adjustment of the amplitude of lateral oscillation of the torch 10, as well as of the position of the torch, other mechanisms which afford adjustable lateral oscillation may also be provided. For example, a disc having an end face disposed at an angle with respect to its axis may be used as a cam by being spring biased against a follower, such as a ball bearing which is disposed eccentrically with respect to the axis of the cam disc. A housing may be coupled to the cam disc which may be rotated by suitable gearing, such as bevel gears which extend into the housing. By adjusting the eccentricity of the cam disc with respect to its follower, the disc and the housing will oscillate laterally at set amplitudes corresponding to the set eccentricity.

From the foregoing description, it will be apparent that there has been provided an improved fully automatic welding system which is capable of practicing the improved method of arc welding which utilizes current pulses both to generate a pulse arc and to effect the oscillation of the height of the torch with respect to the work. The method and system also affords adjustable parameters of lateral oscillation and torch-to-work travel along the weld, as well as the weld current pulses themselves. While illustrative embodiments of the system have been described, it will be appreciated that variations and modifications therein, within the scope of the invention, will undoubtedly suggest themselves to those skilled in the art. Accordingly, the foregoing description should be taken merely as illustrative and not in any limiting sense.

What is claimed is:

1. The method of arc welding which comprises the steps of
   a. supplying current which pulsates repetitively to provide an arc between a torch and the work to be welded,
   b. sensing the amplitude of said pulsating current, and
   c. oscillating said torch normally with respect to said work, repetitively varying the distance separating said torch and said work in inverse relationship to said amplitude.

2. The invention as set forth in claim 1 wherein said current supplying step includes the step of selecting the amplitude of the pulses of said pulsating current.

3. A system for arc welding comprising
   a. a torch
   b. means for supplying current which pulsates repetitively to said torch for providing an arc between the torch and the work to be welded,
   c. means for sensing the amplitude of said pulsating current, and
   d. means for oscillating said torch with respect to said work for providing periodic variation in the height of said torch over said work in inverse relationship to said amplitude.

4. The invention as set forth in claim 3, wherein said current supplying means includes means for controlling the amplitude of the pulses of said pulsating current.

* * * * *